(12) United States Patent
Stryke

(10) Patent No.: US 6,176,458 B1
(45) Date of Patent: Jan. 23, 2001

(54) TRUCK STABILIZER

(76) Inventor: William P. Stryke, 708 Devon La., Wallingford, PA (US) 19086

( * ) Notice: Under 35 U.S.C. 154(b), the term of this patent shall be extended for 0 days.

(21) Appl. No.: 09/317,377

(22) Filed: May 24, 1999

Related U.S. Application Data

(63) Continuation-in-part of application No. 08/938,198, filed on Sep. 25, 1997.

(51) Int. Cl.[7] ....................................... A47F 5/00
(52) U.S. Cl. ..................... 248/351; 248/351; 280/766.1
(58) Field of Search ................................... 248/352, 351, 248/354.4, 130; 108/202, 89.1; 280/763.1, 766.1

(56) References Cited

U.S. PATENT DOCUMENTS

| | | | |
|---|---|---|---|
| 2,375,264 | * | 5/1945 | Wagner et al. .................. 280/766.1 |
| 2,750,204 | * | 6/1956 | Ohrmann ......................... 280/766.1 |
| 3,125,352 | * | 3/1964 | Gouin et al. ..................... 280/766.1 |
| 3,397,898 | * | 8/1968 | Denney et al. ................... 280/263.1 |
| 3,802,720 | * | 4/1974 | Ellis ................................. 280/150 |
| 3,826,322 | * | 7/1974 | Williams .......................... 280/766.1 |
| 4,039,206 | * | 8/1977 | Nault ................................ 280/763 |
| 4,268,066 | * | 5/1981 | Davis ............................... 280/763 |
| 4,576,390 | * | 3/1986 | Vos .................................. 280/766.1 |
| 5,195,764 | * | 3/1993 | Schantz et al. ................... 280/43.23 |
| 5,335,891 | * | 8/1994 | Gilbert ............................. 248/354.1 |
| 5,447,210 | * | 9/1995 | Lai ................................... 180/202 |
| 5,622,235 | * | 4/1997 | Merritt ............................. 280/763 |

* cited by examiner

Primary Examiner—Leslie A. Braun
Assistant Examiner—Kimberly Wood

(57) ABSTRACT

A truck stabilizer system is provided including a truck having a cargo container with a top face, a bottom face, a front face, a rear face, and a pair of side faces. A plurality of arm assemblies is coupled to the cargo container and have a wheel rotatably coupled to an end thereof. Each arm assembly is adapted to lengthen upon the actuation thereof and further retract upon the deactuation thereof.

8 Claims, 3 Drawing Sheets

TRUCK STABILIZER

REFERENCE TO RELATED APPLICATIONS

This application is a continuation-in-part of my utility U.S. patent application filed Sep. 25, 1997 and assigned the application Ser. No. 08/938,198.

BACKGROUND OF THE INVENTION

1. Field of the Invention

The present invention relates to retractable wheels for trucks and more particularly pertains to a new truck stabilizer for preventing a truck from tipping while in motion.

2. Description of the Prior Art

The use of retractable wheels for trucks is known in the prior art. More specifically, retractable wheels for trucks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,195,764; U.S. Pat. No. 4,817,537; U.S. Pat. No. 5,257,671; U.S. Pat. No. 4,382,631; U.S. Pat. No. 4,576,390; and U.S. Pat. No. Des. 349,801.

Prior art stabilizing structures in general focus on assemblies mounted on the frame forming the lower portion of a vehicle, and thus provide only limited stabilizing benefits for vehicles, such as trucks and trailer, with relatively tall cargo containers which are mounted above the frame of the vehicle. Any cargo placed in the cargo container only adds further weight that is located above the lower frame and any stabilizing assemblies mounted on the frame.

In these respects, the truck stabilizer according to the present invention substantially departs from the conventional concepts and designs of the prior art, and in so doing provides an apparatus primarily developed for the purpose of preventing a truck from tipping while in motion.

SUMMARY OF THE INVENTION

In view of the foregoing disadvantages inherent in the known types of retractable wheels for trucks now present in the prior art, the present invention provides a new truck stabilizer construction wherein the same can be utilized for preventing a truck from tipping while in motion.

The general purpose of the present invention, which will be described subsequently in greater detail, is to provide a new truck stabilizer apparatus and method which has many of the advantages of the retractable wheels for trucks mentioned heretofore and many novel features that result in a new truck stabilizer which is not anticipated, rendered obvious, suggested, or even implied by any of the prior art retractable wheels for trucks, either alone or in any combination thereof.

The invention is ideally employed on a vehicle having a frame and an enclosed cargo container mounted on the frame. The cargo container has a front face a rear face, and a pair of vertical side faces. Corners are formed at the intersection of the front and rear faces with the side faces.

A plurality of arm assemblies are provided for stabilizing the cargo container in a direct manner, and thereby providing a measure of stability to the vehicle frame on which the cargo container is mounted. Each arm assembly is mounted on a side face of the cargo container, so that at least one arm assembly is mounted on each side face, and consequently each side of the cargo container has at least one arm assembly for providing lateral stability for the cargo container. Another preferred feature of the invention is that an arm assembly may be located at each end of the side face, and most preferably adjacent to a corner of the cargo container such that the cargo container is provided with longitudinal stability. The cargo container is thus provided with both lateral and longitudinal stability by the arm assemblies of the invention.

Each arm assembly preferably includes a rectangular plate having an aperture formed in each corner thereof for allowing the coupling of the plate of the arm assembly with the side faces of the cargo container. Preferably, a hydraulic cylinder is included with a first portion fixedly coupled to the plate. Ideally, the first portion of each hydraulic cylinder extends from the plate such that an axis about which the cylinder is formed defines an angle of about 30 degrees with a plane in which the plate resides. A second portion of the hydraulic cylinder is slidably situated in the first portion and the second portion is adapted to extend from the first portion upon the actuation of the hydraulic cylinder. The second portion of the hydraulic cylinder is retractable into the first portion upon the deactuation of the hydraulic cylinder.

A wheel is rotatably coupled to a free end of the second portion of the hydraulic cylinder and resides in a plane offset and parallel with that of the plate. It should be noted that the forgoing hydraulic arm assemblies include a first set of hydraulic arm assemblies having the plates thereof coupled to a first side face of the cargo container adjacent to the front face and rear face near corners of the container. Such arm assemblies further include a second set of hydraulic arm assemblies having the plates thereof coupled to a second side face of the cargo container adjacent to the front face and rear face thereof.

A tilt switch is situated in or on the cargo container. The tilt switch is adapted to detect tilt of the cargo container, and actuate only the hydraulic cylinders of the first set of hydraulic arm assemblies (mounted on a first side face of the cargo container) upon the detection of the tilting of the cargo container in a first lateral direction toward the first side. The tilt switch further serves to actuate only the hydraulic cylinders of the second set of hydraulic arm assemblies (mounted on a second side face of the cargo container) upon the detection of the tilting of the cargo container in a second lateral direction opposite the first direction. If the tilt switch does not detect a tilted orientation of the cargo container, the tilt switch deactuates the hydraulic cylinders of both sets of hydraulic arm assemblies.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new truck stabilizer apparatus and method which has many of the advantages of the retractable wheels for trucks mentioned heretofore and many novel features that result in a new truck stabilizer which is not anticipated, rendered obvious, suggested, or even implied by any of the prior art retractable wheels for trucks, either alone or in any combination thereof.

It is another object of the present invention to provide a new truck stabilizer which may be easily and efficiently manufactured and marketed.

It is a further object of the present invention to provide a new truck stabilizer which is of a durable and reliable construction.

An even further object of the present invention is to provide a new truck stabilizer which is susceptible of a low cost of manufacture with regard to both materials and labor, and which accordingly is then susceptible of low prices of sale to the consuming public, thereby making such truck stabilizer economically available to the buying public.

Still yet another object of the present invention is to provide a new truck stabilizer which provides in the apparatuses and methods of the prior art some of the advantages thereof, while simultaneously overcoming some of the disadvantages normally associated therewith.

Still another object of the present invention is to provide a new truck stabilizer for preventing a truck with a cargo container mounted thereon from tipping while in motion.

Even still another object of the present invention is to provide a new truck stabilizer that includes a truck having a cargo container with a plurality of arm assemblies coupled to the cargo container. Each arm assembly is adapted to lengthen upon the actuation thereof and further retract upon the deactuation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
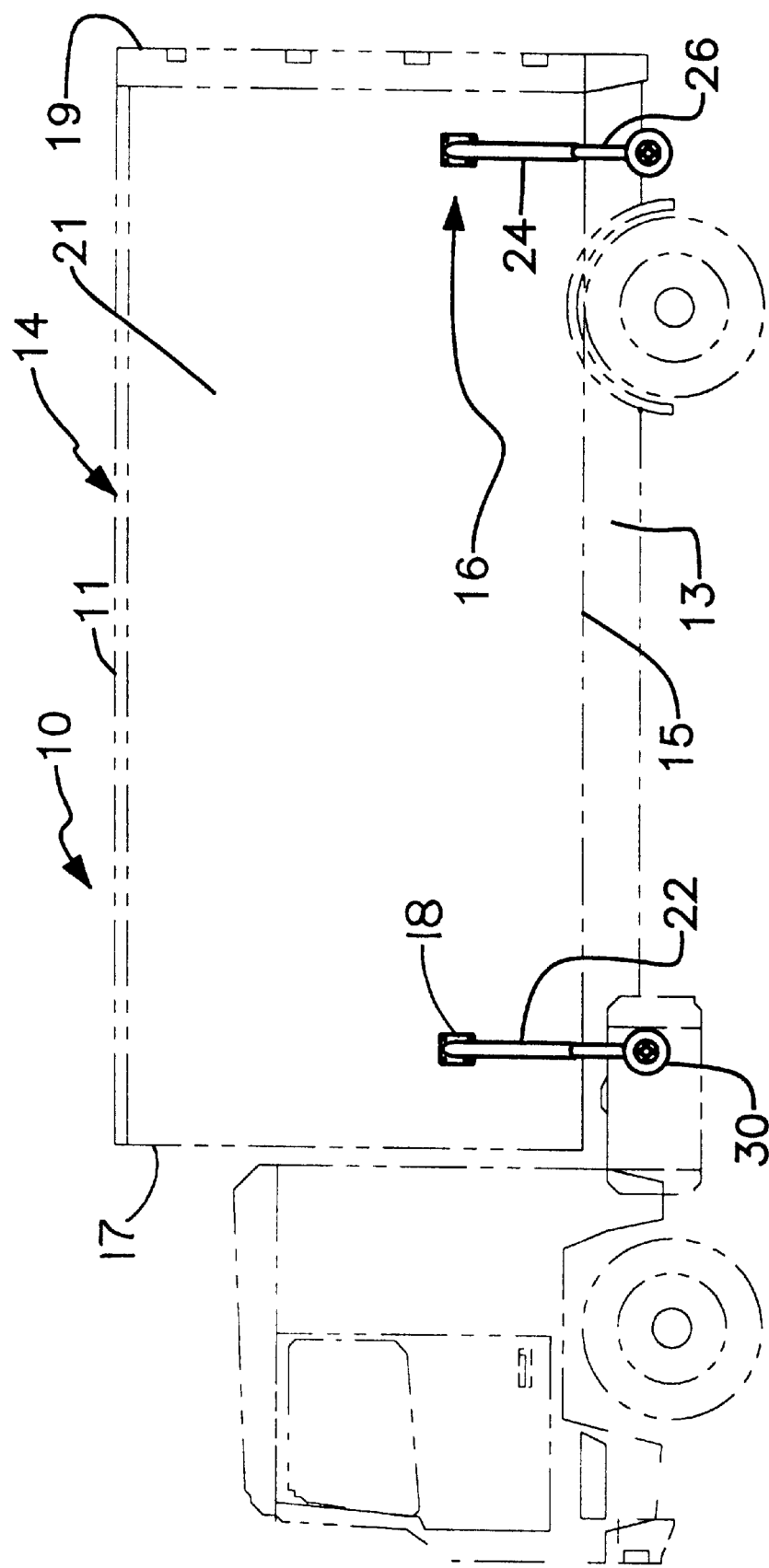
FIG. 1 is a schematic side view of a truck stabilizer according to the present invention.
Figure 2:
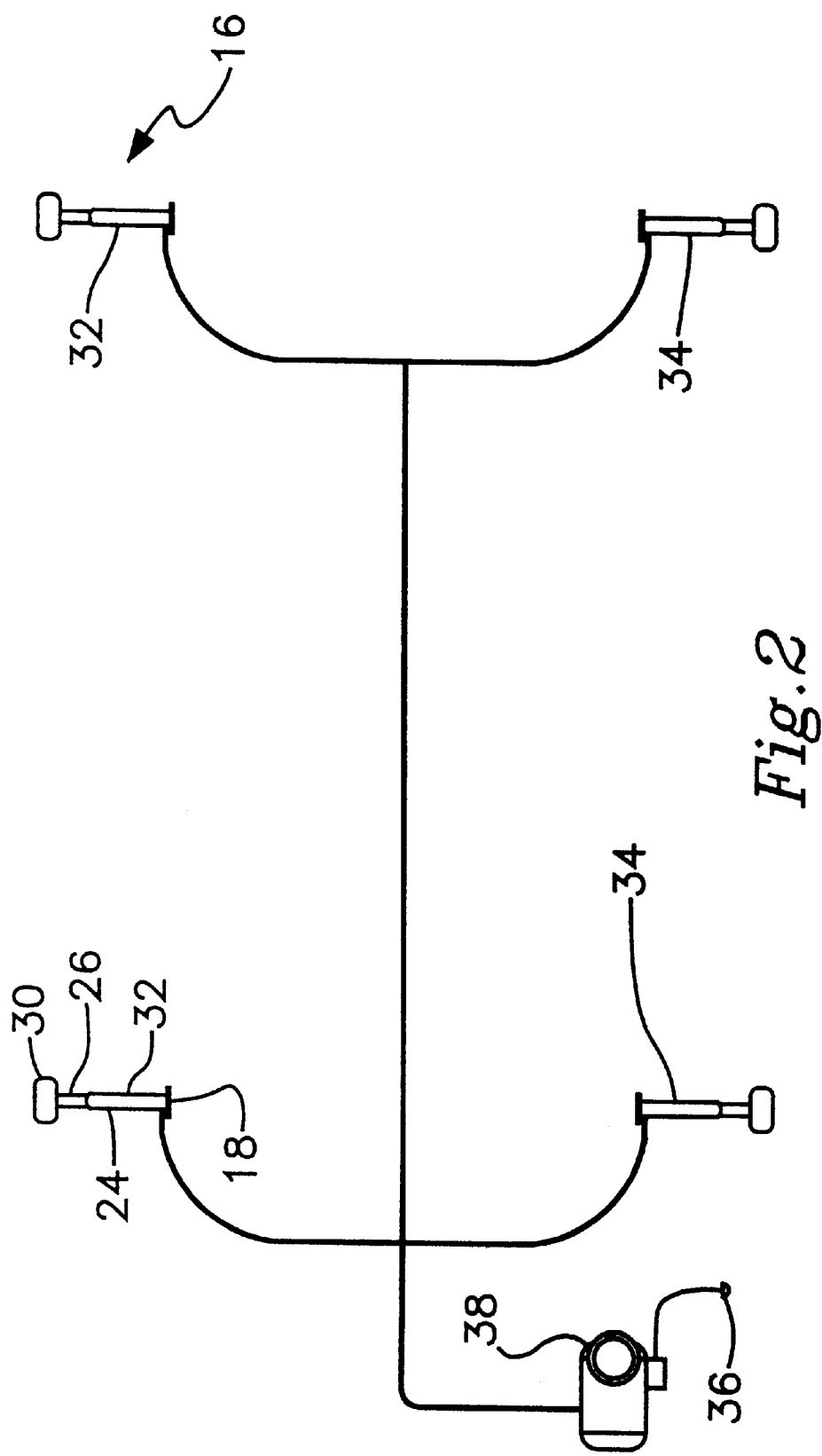
FIG. 2 is a schematic view of the interconnection of the tilt switch and hydraulic cylinders of the present invention.
Figure 3:
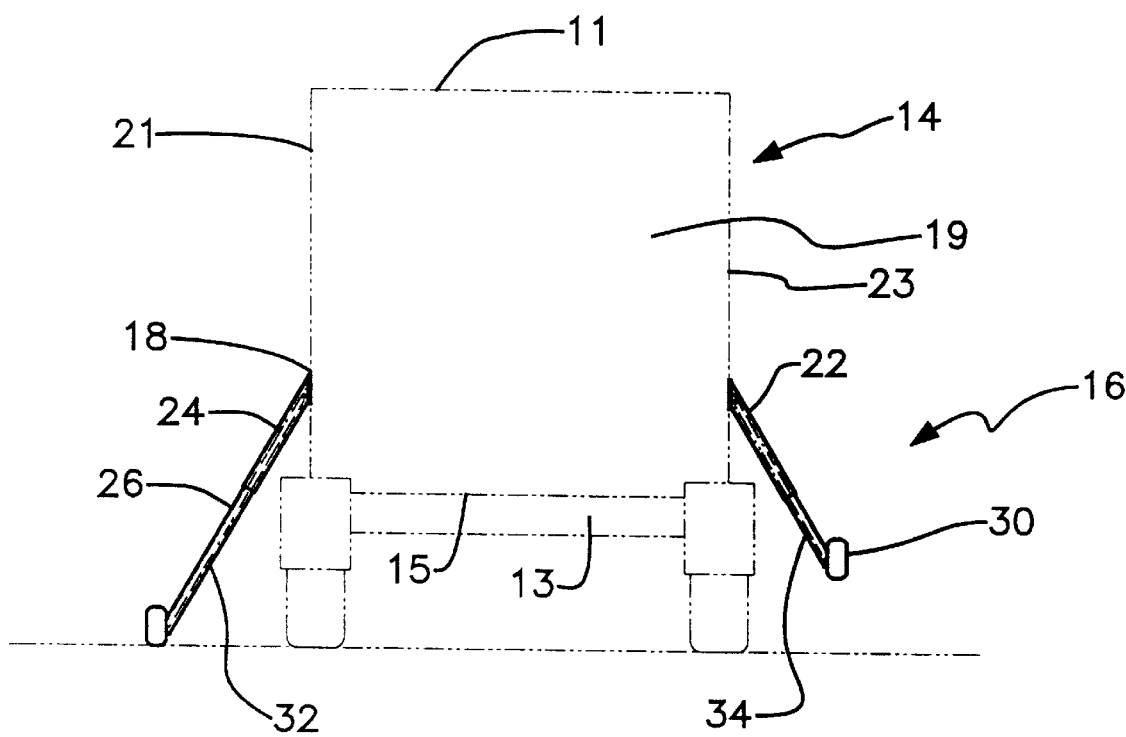
FIG. 3 is a schematic rear view of the present invention.
Figure 4:
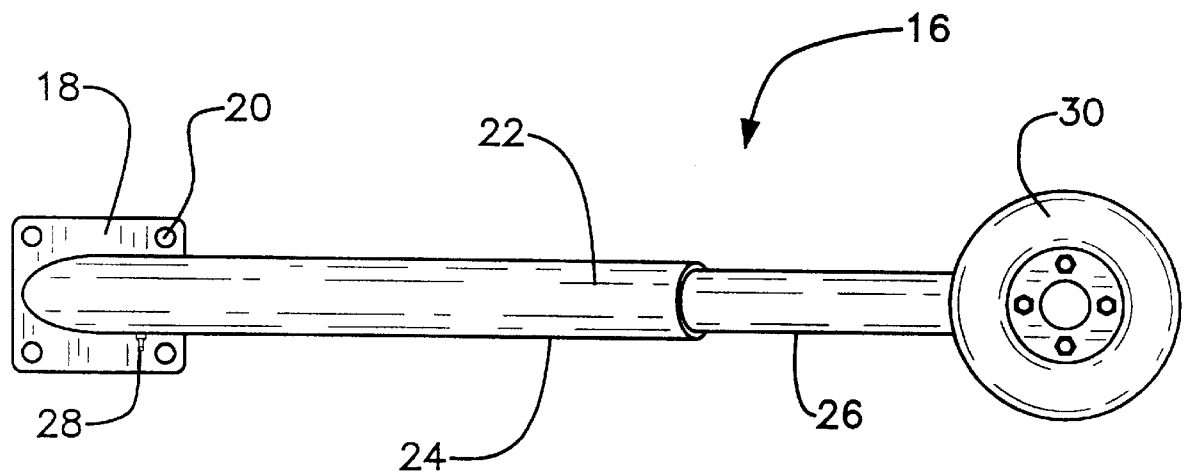
FIG. 4 is a schematic enlarged view of one of the hydraulic arm assemblies of the present invention.

With reference now to the drawings, and in particular to FIGS. 1 through 4 thereof, a new truck stabilizer embodying the principles and concepts of the present invention and generally designated by the reference numeral 10 will be described.

The invention is ideally employed on a vehicle such as a truck or a trailer pulled behind a truck tractor. Illustratively, a truck 10 employing the invention has a frame 13 and an enclosed cargo container 14 mounted on the frame 13. The cargo container 14 has a top face 11. a bottom face 15. a front face 17, a rear face 19, and a pair of vertical side faces 21 and 23. Corners are formed at the intersection of the front 17 and rear 19 faces with the side faces 21, 23 of the cargo container. Optionally, the top face may be omitted from the cargo container without departing from the invention.

A plurality of arm assemblies 16 are provided for stabilizing the cargo container 14 in a direct manner, and thereby provide a measure of stability to the vehicle on which the cargo container is mounted. Each arm assembly 16 is mounted on one of the side faces 21, 23 of the cargo container, so that at least one arm assembly is mounted on each side face. As a consequence, each side face 21, 23 of the cargo container has at least one arm assembly 16 for providing lateral (e.g., side to side) stability for the cargo container. Another highly preferred feature of the invention is that an arm assembly 16 may be located at each end of each of the side faces 21, 23, and most preferably adjacent to a corner of the cargo container 14 such that the cargo container is provided with longitudinal (e.g., front to rear) stability. The cargo container 14 is thus provided with both lateral and longitudinal stability by the arm assemblies 16 of the invention.

Each arm assembly 16 (see FIG. 4) preferably includes a rectangular plate 18 having at least one aperture formed in each corner thereof for allowing the coupling of the plate of the arm assembly to the side face 21. 23 of the cargo container 14. Preferably, a hydraulic cylinder 22 is employed which includes a first portion 24 fixedly coupled to the plate 18. Ideally, the first portion 24 of each hydraulic cylinder 22 may extend from the plate 18 such that a longitudinal axis of the hydraulic cylinder forms an angle of about 30 degrees with a plane in which the plate resides. A second portion 26 of the hydraulic cylinder 22 is slidably situated in the first portion 24 and the second portion is adapted to extend from the first portion upon the actuation of the hydraulic cylinder. The second portion 26 of the hydraulic cylinder is retractable into the first portion 24 upon the deactuation of the hydraulic cylinder.

A wheel 30 is rotatably coupled to a free end of the second portion 26 of the hydraulic cylinder and resides in a plane offset and parallel with that of the plate. The wheel may be formed of various suitable constructions, and ideally would include a double walled or double tubed tire with puncture resistant walls for added safety.

The forgoing hydraulic arm assemblies include a first set 32 of hydraulic arm assemblies having the plates thereof coupled to a first side face 21 of the cargo container adjacent to the front face 17 and rear face 19 near the respective corners of the cargo container 14. The arm assemblies also include a second set 34 of hydraulic arm assemblies having the plates thereof coupled to a second side face 23 of the cargo container 14 adjacent to the front face 17 and rear face 19 thereof.

A tilt switch 36 is situated in or on the cargo container 14 to move with the cargo container to thereby detect the relative tilt orientation, if any, of the cargo container. The tilt switch 36 is adapted to actuate only the hydraulic cylinders of the first set 32 of hydraulic arm assemblies (mounted on the first side face 21 of the cargo container) upon the detection of the tilting of the cargo container in a first lateral direction toward the first side face 21. The tilt switch 36 further serves to actuate only the hydraulic cylinders of the second set 34 of hydraulic arm assemblies upon the detection of the tilting of the cargo container in a second lateral direction opposite the first direction. If the tilt switch 36 does not detect tilt of the cargo container, the tilt switch deactuates the hydraulic cylinders of both sets of hydraulic arm assemblies. To accomplish this, the tilt switch 36 may take the form of any suitable switch, such as, for example, a mercury switch. The tilt switch 36 is connected to a valve in communication with a hydraulic fluid pump 38 which vary the volume of fluid in each of the hydraulic cylinders accordingly to the tilt orientation of the cargo container that is to be resisted.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle stabilizing apparatus for a vehicle of the type having a frame and a cargo container mounted on the frame, a cargo container having at least a bottom face, a front face, a rear face, and a pair of vertical side faces with intersect the front and rear faces to form four corners of the cargo container, the vehicle stabilizing system comprising:

at least four hydraulic arm assemblies mounted on a cargo container, each of the arm assemblies mounted on one of the side faces of the cargo container near one of the corners of the enclosed cargo container such that at least one arm assembly is positioned adjacent to each corner of the cargo container for stabilizing the cargo container, each hydraulic arm assembly including:

a substantially rectangular plate having an aperture formed in each corner for coupling the plate to the corresponding side face of the cargo container with fasteners, a hydraulic cylinder including a first portion fixedly coupled to the plate and extending therefrom such that an axis about which the cylinder is formed defines an angle of about 30 degrees with a plane in which the plate and the corresponding side face of the cargo container resides and a second portion slidably situated within the first portion and adapted to extend from the first portion upon the actuation of the hydraulic cylinder and further retract into the first portion upon the deactuation of the hydraulic cylinder, and a wheel rotatably coupled to a free end of the second portion of the hydraulic cylinder and residing in a plane offset and parallel with that of the plate;

wherein said hydraulic arm assemblies include a first set of hydraulic arm assemblies having the plates thereof coupling to a first side face of the cargo container adjacent to the front face and rear face of the cargo container, and a second set of hydraulic arm assemblies having the plates thereof coupling to a second side face of the cargo container adjacent to the front face and rear face of the cargo container; and a tilt switch situated on the cargo container and adapted to actuate only the hydraulic cylinders of the first set of hydraulic arm assemblies upon the detection of the tilting of the cargo container in a first lateral direction and further adapted to actuate only the hydraulic cylinders of the second set of hydraulic arm assemblies upon the detection of the tilting of the cargo container in a second lateral direction opposite the first direction, and wherein upon the detection that the cargo container is not in a tilted orientation the tilt switch is adapted to deactuate the hydraulic cylinders of both sets of hydraulic arm assemblies.

2. A vehicle stabilizing system comprising, in combination:

a vehicle having a frame and a cargo container mounted on the frame, the enclosed cargo container having a bottom face, a front face, a rear face, and a pair of vertical side faces which intersect the front and rear faces to form four corners of the cargo container; and a vehicle stabilizing apparatus comprising:

at least four arm assemblies mounted on the cargo container, each of the arm assemblies being mounted on one of the side faces of the cargo container near one of the corners of the cargo container such that at least one arm assembly is positioned adjacent to each corner of the cargo container for stabilizing the corners of the cargo container, each arm assembly including a plate having an aperture formed in each corner thereof for coupling the plate to the corresponding side face of the trailer with a fastener, a telescoping cylinder including a first portion fixedly coupled to the plate and extending therefrom and a second portion telescopically mounted to the first portion, the second portion being adapted to extend from the first portion upon the actuation of the telescoping cylinder and further adapted to retract into the first portion upon the deactuation of the telescoping cylinder, and a wheel rotatably coupled to a free end of the second portion of the telescoping cylinder and residing in a plane offset and parallel with that of the plate;

wherein said arm assemblies include a first set of arm assemblies having the plates thereof coupled to a first side face of the cargo container adjacent to the front face and rear face of the cargo container, and a second set of arm assemblies having the plates thereof coupled to a second side face of the cargo container adjacent to the front face and rear face of the cargo container; and a tilt switch situated on the cargo container and adapted to actuate only the telescoping cylinders of the first set of arm assemblies upon the detection of the tilting of the cargo container in a first lateral direction and further adapted to actuate only the telescoping cylinders of the second set of arm assemblies upon the detection of the tilting of the cargo container in a second lateral direction opposite the first direction, and wherein upon the detection that the cargo container is not in a tilted orientation the tilt switch is adapted to deactuate the telescoping cylinders of both sets of arm assemblies.

3. The vehicle stabilizing system of claim 2 wherein the vehicle stabilizing apparatus comprises at least four arm assemblies.

4. The vehicle stabilizing system of claim 2 wherein the longitudinal axis of the first portion of the arm assembly forms an angle of about 30 degrees with a plane in which the plate and the corresponding side face of the cargo container reside.

5. The vehicle stabilizing system of claim 2 wherein each set of arm assemblies comprises a pair of arm assemblies.

6. The vehicle stabilizing system of claim 2 wherein the telescoping cylinders of the arm assemblies each comprise a hydraulically actuated piston and cylinder device.

7. The vehicle stabilizing system of claim 6 wherein the tilt switch actuates a valve in communication with a hydraulic pump for selectively varying the volume of fluid in each of the hydraulically-actuated piston and cylinder devices.

8. A vehicle stabilizing system comprising, in combination:

vehicle having a frame and an enclosed cargo container mounted on the frame, the enclosed cargo container having a top face, a bottom face, a front face, a rear face, and a pair of vertical side faces which intersect the front and rear faces to form four corners of the enclosed cargo container;

at least four hydraulic arm assemblies mounted on the enclosed cargo container, each of the arm assemblies being mounted on one of the side faces of the enclosed cargo container near one of the corners of the enclosed cargo container such that at least one arm assembly is positioned adjacent to each corner of the enclosed cargo container for stabilizing the corners of the container, each hydraulic arm assembly including a substantially rectangular plate having an aperture formed in each corner thereof for coupling the plate to the corresponding side face of the trailer with fasteners, a hydraulic cylinder including a first portion fixedly coupled to tile plate and extending therefrom such that an axis about which the cylinder is formed defines an angle of about 30 degrees with a plane in which the plate and the corresponding side face of the enclosed cargo container resides and a second portion slidably situated within the first portion and adapted to extend from the first portion upon the actuation of the hydraulic cylinder and further retract into the first portion upon the deactuation of the hydraulic cylinder, and a wheel rotatably coupled to a free end of the second portion of the hydraulic cylinder and residing in a plane offset and parallel with that of the plate;

said hydraulic arm assemblies including a first set of hydraulic arm assemblies having the plates thereof coupled to a first side face of the enclosed cargo container adjacent to the front face and rear face of the cargo container, and a second set of hydraulic arm assemblies having the plates thereof coupled to a second side face of the cargo container adjacent to the front face and rear face of the cargo container; and a tilt switch situated on the cargo container and adapted to actuate only the hydraulic cylinders of the first set of hydraulic arm assemblies upon the detection of the tilting of the cargo container in a first lateral direction and further adapted to actuate only the hydraulic cylinders of the second set of hydraulic arm assemblies upon the detection of the tilting of the cargo container in a second lateral direction opposite the first direction, and wherein upon the detection that the cargo container is not in a tilted orientation the tilt switch is adapted to deactuate the hydraulic cylinders of both sets of hydraulic arm assemblies.

\* \* \* \* \*